(12) United States Patent
Terashima et al.

(10) Patent No.: US 9,058,207 B2
(45) Date of Patent: Jun. 16, 2015

(54) SIMULATION APPARATUS, METHOD, AND COMPUTER-READABLE RECORDING MEDIUM

(75) Inventors: Hiroshi Terashima, Yokohama (JP); Yasuki Nakamura, Yokohama (JP); Ryo Kuya, Yokohama (JP); Tatsuya Yoshino, Yokohama (JP); Masaharu Kimura, Yokohama (JP)

(73) Assignee: SOCIONEXT INC., Yokohama (JP)

( * ) Notice: Subject to any disclaimer, the term of this patent is extended or adjusted under 35 U.S.C. 154(b) by 158 days.

(21) Appl. No.: 13/198,828

(22) Filed: Aug. 5, 2011

(65) Prior Publication Data

US 2012/0204184 A1 Aug. 9, 2012

(30) Foreign Application Priority Data

Oct. 5, 2010 (JP) ................................. 2010-226079

(51) Int. Cl.
*G06F 9/46* (2006.01)
*G06F 9/48* (2006.01)

(52) U.S. Cl.
CPC .................................... *G06F 9/4881* (2013.01)

(58) Field of Classification Search
None
See application file for complete search history.

(56) References Cited

U.S. PATENT DOCUMENTS

| | | | |
|---|---|---|---|
| 5,363,506 A | 11/1994 | Fukuoka | |
| 7,150,021 B1* | 12/2006 | Vajjhala et al. | 718/104 |
| 2004/0064817 A1* | 4/2004 | Shibayama et al. | 718/104 |
| 2005/0033881 A1* | 2/2005 | Yao | 710/52 |
| 2006/0107268 A1* | 5/2006 | Chrabieh | 718/100 |
| 2006/0294522 A1* | 12/2006 | Havens | 718/103 |
| 2007/0113231 A1 | 5/2007 | Honmura | |
| 2008/0183312 A1* | 7/2008 | Funk et al. | 700/45 |
| 2008/0228461 A1* | 9/2008 | Calvez | 703/16 |
| 2009/0024985 A1* | 1/2009 | Hommura et al. | 717/129 |
| 2009/0113426 A1* | 4/2009 | Mizuno | 718/1 |
| 2009/0113432 A1 | 4/2009 | Singh et al. | |
| 2009/0222250 A1* | 9/2009 | Ito | 703/14 |
| 2009/0254908 A1 | 10/2009 | Klave et al. | |
| 2010/0169068 A1* | 7/2010 | Kuya et al. | 703/21 |

FOREIGN PATENT DOCUMENTS

| | | |
|---|---|---|
| EP | 1022654 | 7/2000 |
| EP | 1286264 | 2/2003 |
| JP | 04-074229 A | 3/1992 |
| JP | 10-289114 A | 10/1998 |
| JP | 2001-236236 A | 8/2001 |
| JP | 2003-186686 A | 7/2003 |

OTHER PUBLICATIONS

Extended European Search Report dated Mar. 7, 2014 for corresponding European Application No. 11176656.4, 7 pages.

(Continued)

*Primary Examiner* — Emerson Puente
*Assistant Examiner* — Dong Kim
(74) *Attorney, Agent, or Firm* — Westerman, Hattori, Daniels & Adrian, LLP

(57) ABSTRACT

A simulation apparatus is disclosed, including a group switching part. The group switching part refers to a priority management table, which manages priority information of priorities to assign a CPU for multiple groups of tasks stored in a storage area, and changes the priorities of the multiple groups of tasks, when an event occurs to activate a task to be executed in verifying of software by using a simulation.

8 Claims, 10 Drawing Sheets

(56) References Cited

OTHER PUBLICATIONS

Kuritani, Kazumichi, et al., "Evaluation of Adaptive Scheduling for RTOS," Transactions from Information Processing Society of Japan, Mar. 12, 2003, vol. 2003, No. 29, pp. 137-142, with Partial English Translation.

Japanese Office Action issued Apr. 1, 2014 for corresponding Japanese Application No. 2010-226079, with Partial English Translation, 4 pages.

* cited by examiner

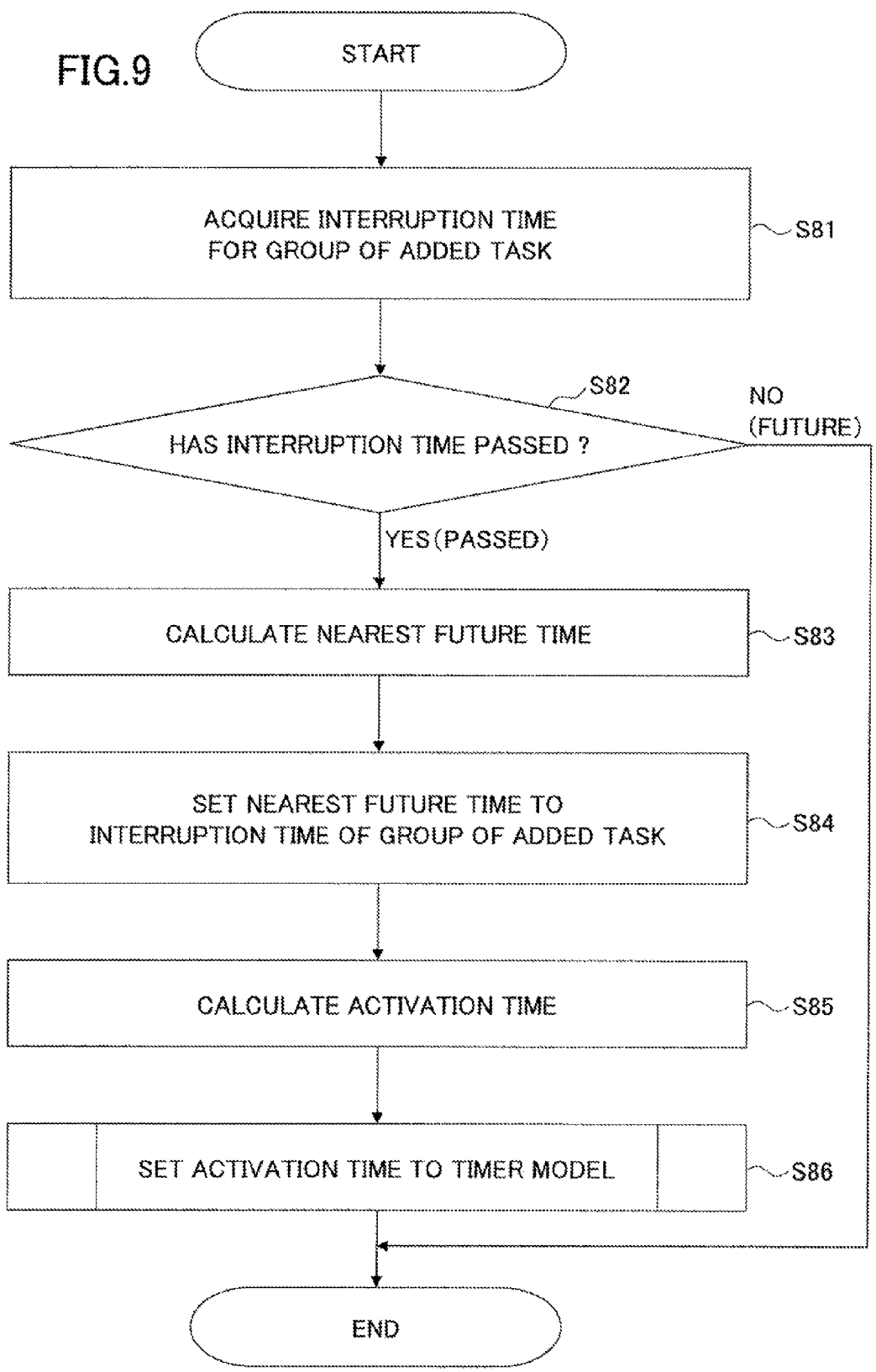

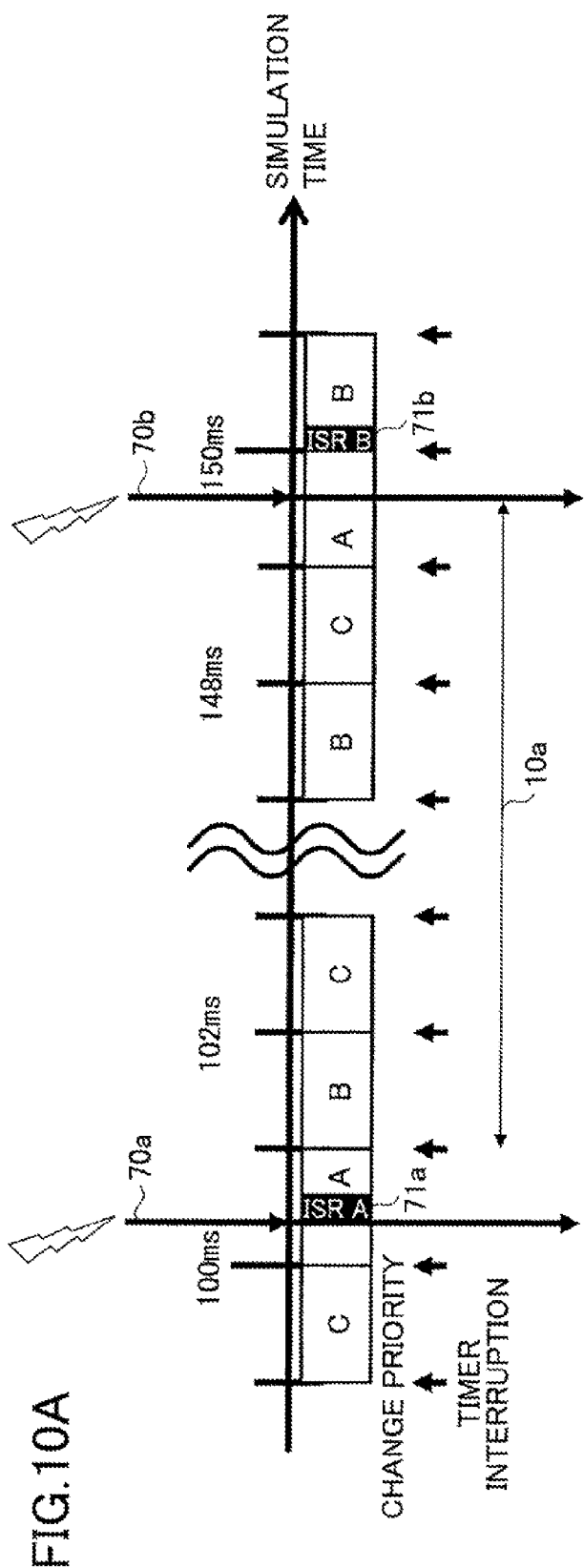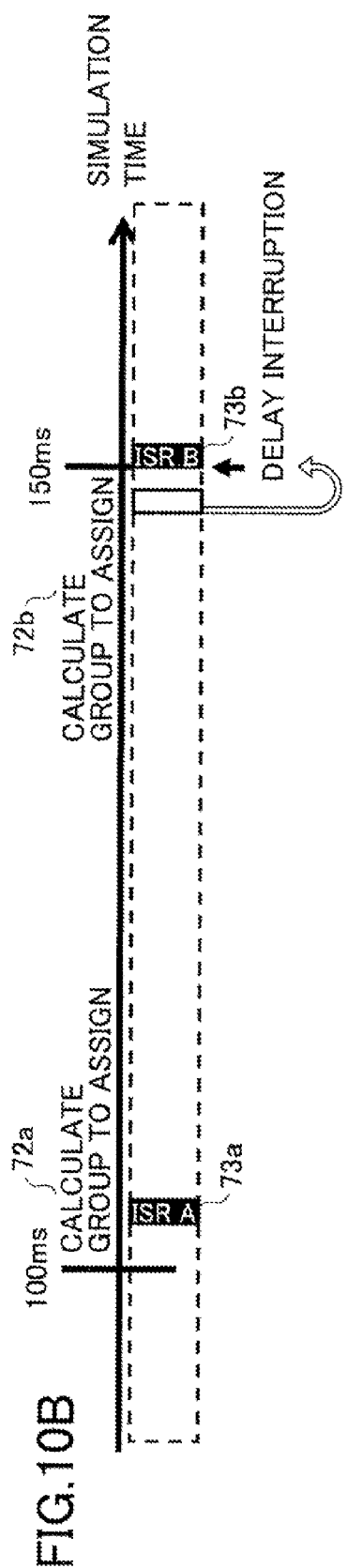
FIG.10A
FIG.10B

SIMULATION APPARATUS, METHOD, AND COMPUTER-READABLE RECORDING MEDIUM

CROSS-REFERENCE TO RELATED APPLICATIONS

This patent application is based upon and claims the benefit of priority of the prior Japanese Patent Application No. 2010-226079 filed on Oct. 5, 2010, the entire contents of which are incorporated herein by reference.

FIELD

The embodiment discussed herein is related to a simulation apparatus, method, and non-transitory computer-readable recording medium to verify software by using a simulation.

BACKGROUND

Recently, various devices embedding software such as electronic appliances and precision instruments are widely used. Also, a mechanism of a system including the software has become more complicated and become a large scale. Thus, the number of steps to verify the software by using a simulation is increased, and a process time is concerned.

As related technologies concerning a multitasking process utilized in a verification of the software, one technology is proposed in which regardless of an priority order between tasks which are not processed in a real-time, processes for the tasks wait for an end of an executing task. Another technology is proposed in which multiple interruptions occurred in an interruption inhibiting period are processed in an order of an interruption occurrence after interruptions are allowed.

However, in a case of verifying the software on a RTOS (Real-Time Operating System) performing multitasking, even if no task interruption occurs, the above-described technologies require a mechanism to periodically perform processes of occurring an interruption at a time interval to permit an execution of a task group and of checking if a task interruption is made. Accordingly, the above-described technologies do not solve a problem related to a workload of a simulation process.

SUMMARY

According to one aspect of the embodiments, there is provided a simulation apparatus, including a group switching part configured to refer to a priority management table, which manages priority information of priorities to assign a CPU for multiple groups of tasks stored in a storage area, and to change the priorities of the multiple groups of tasks, when an event occurs to activate a task to be executed in verifying of software by using a simulation.

According to another aspect of the embodiments, there is provided a simulation method performed in a computer, the method including referring to, by the computer, a priority management table, which manages priority information of priorities to assign a CPU for multiple groups of tasks stored in a storage area; and changing, by the computer, the priorities of the multiple groups of tasks, when an event occurs to activate a task to be executed in verifying of software by using a simulation.

According to a further aspect of the embodiments, there is provided a non-transitory computer-readable recording medium recorded with a program which, when executed by a computer, causes the computer to perform a process including referring to a priority management table, which manages priority information of priorities to assign a CPU for multiple groups of tasks stored in a storage area; and changing the priorities of the multiple groups of tasks, when an event occurs to activate a task to be executed in verifying of software by using a simulation.

The object and advantages of the invention will be realized and attained by means of the elements and combinations particularly pointed out in the appended claims.

It is to be understood that both the foregoing general description and the following detailed description are exemplary and explanatory and are not restrictive of the invention as claimed.

BRIEF DESCRIPTION OF THE DRAWINGS

A complete understanding of the present invention may be obtained by reference to the accompanying drawings, when considered in conjunction with the subsequent, detailed description, in which:

FIG. 9 is a diagram for explaining a process conducted by a delay interruption part in the functional configuration example illustrated in FIG. 8;

FIG. 10A is a diagram illustrating an interruption occurrence state in a case in which the first and second embodiment are not applied; and FIG. 10B a diagram illustrating an interruption occurrence state in which the first or second embodiment is applied.

DESCRIPTION OF EMBODIMENTS

Figure 1:
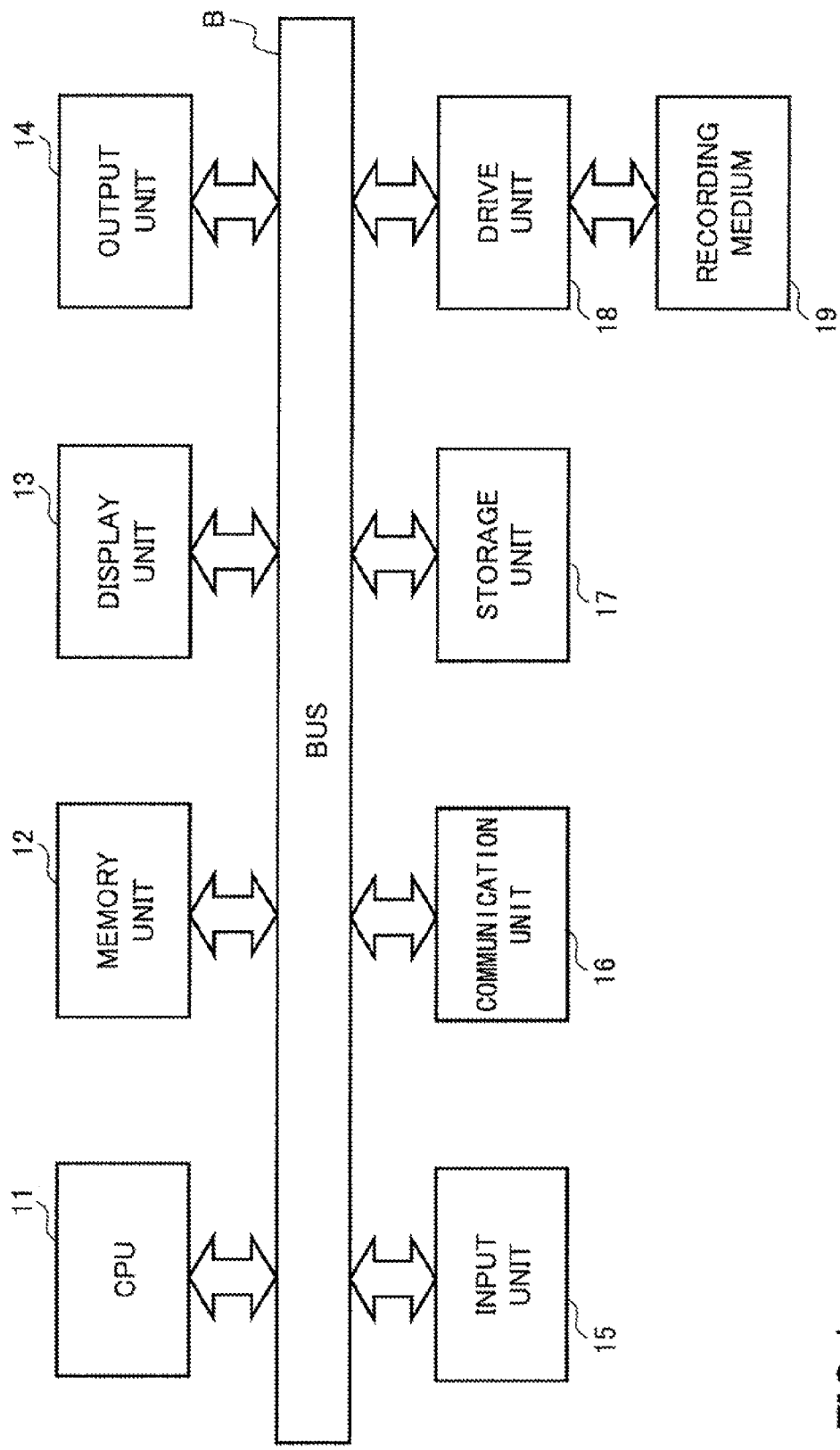
FIG. 1 is a block diagram illustrating a hardware configuration of a simulation apparatus.

In the following, embodiments of the present invention will be described with reference to the accompanying drawings. A simulation apparatus according to embodiments is a computer apparatus which embeds an RTOS (Real-Time Operating System) capable of performing multitasking, and which simulates software of a verification target operating on the RTOS at high speed. The simulation apparatus includes a hardware configuration as illustrated in FIG. 1. FIG. 1 is a block diagram illustrating the hardware configuration of the simulation apparatus.

In FIG. 1, the simulation apparatus 100 includes a processor such as a CPU (Central Processing Unit) 11, a memory unit 12, a display unit 13, an output unit 14, an input unit 15, a communication unit 16, a storage unit 17, and a drive 18, which are connected to a system bus B.

The CPU 11 controls the simulation apparatus 100 in accordance with a program stored in the memory unit 12. As the memory unit 12, a RAM (Random Access Memory), a ROM (Read Only Memory), and the like are used to store the program to be executed by the CPU 11, data necessary for a process by the CPU 11, data acquired in the process by the CPU 11, and the like. Also, a part of an area of the memory unit 12 is assigned as a working area used for the process conducted by the CPU 11.

The display unit 13 displays various necessary information items under a control of the CPU 11. The output unit 14 may include a printer and the like, and is used to output various information items in response to an instruction of the user. The input unit 15 may include a mouse, a keyboard, and the like, and is used by the user to input various necessary information items for the simulation apparatus 100 to conduct the process. The communication unit 16 connects the Internet, a LAN (Local Area Network), and the like, and conducts a communication control between the simulation apparatus 100 and an external apparatus. As the storage unit 17, a hard disk unit may be used to store data such as programs executing various processes.

The program realizing the process conducted by the simulation apparatus 100 may be provided to the simulation apparatus 100 by a non-transitory (or tangible) computer-readable recording medium 19 such as a CD-ROM (Compact Disc Read-Only Memory) or the like. That is, when the recording medium 19 storing the program is set to the drive 18, the drive 18 reads out the program from the non-transitory computer-readable recording medium 19, and the program being read is installed into the storage unit 17 through the system bus B. When the program is activated, the CPU 11 begins the process in accordance with the program installed in the storage unit 17.

It should be noted that a medium to store the program is not limited to the CD-ROM. Any computer-readable recording medium can be used. As the computer-readable recording medium, a DVD (Digital Versatile Disk), a portable recording medium such as a USB (Universal Serial Bus) memory, a semiconductor memory such as a flash memory, and the like can be used as well as the CD-ROM.

<First Embodiment>

Figure 2:
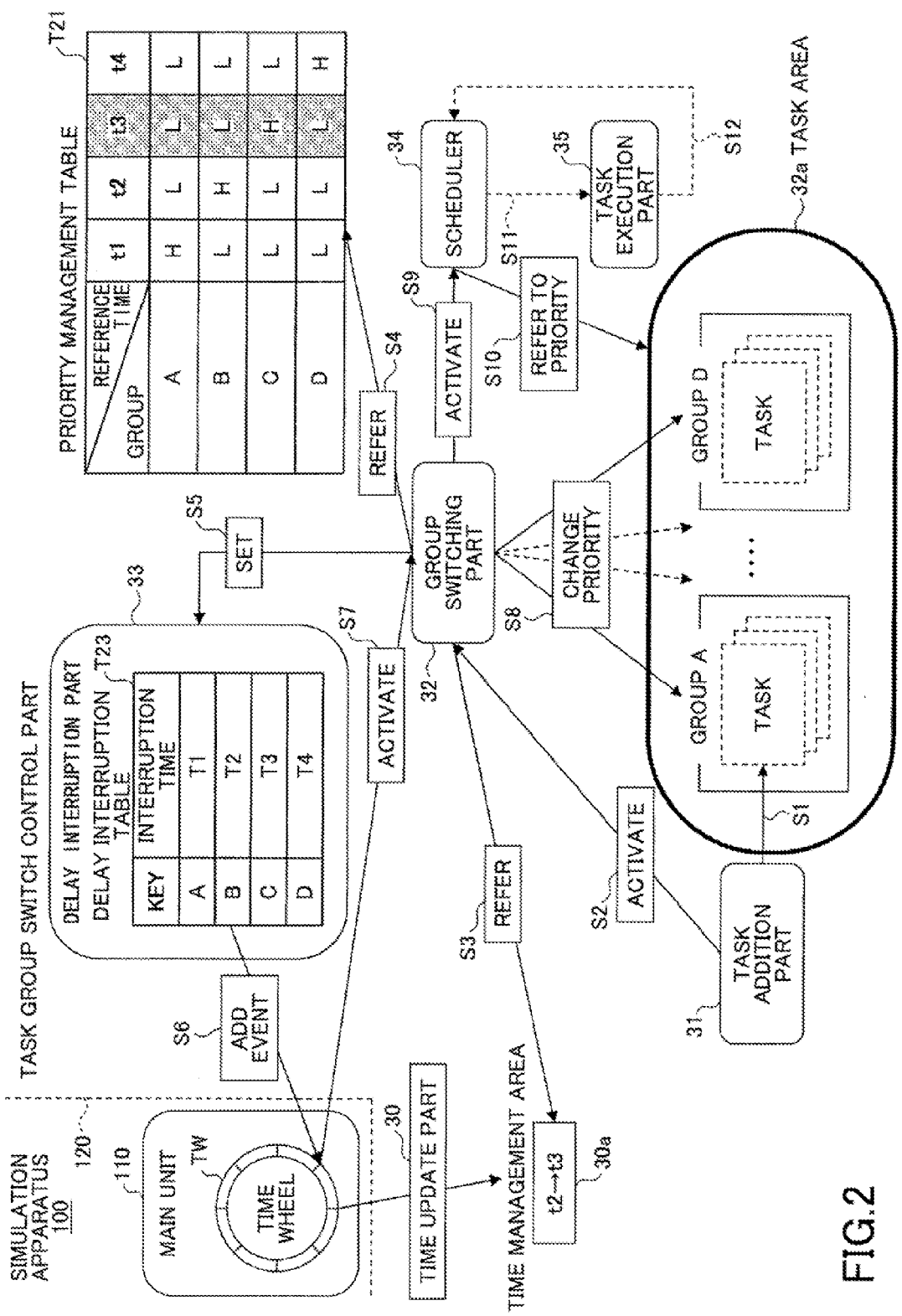
FIG. 2 is a functional configuration example in a first embodiment of the simulation apparatus.

A functional configuration in a first embodiment of the simulation apparatus 100 will be described. FIG. 2 is a functional configuration example in the first embodiment of the simulation apparatus 100. In FIG. 2, the simulation apparatus 100 mainly includes a main unit 110, and a task group switch control part 120. The main unit 110 and the task group switch control part 120 can be realized by the CPU 11 which executes respective programs.

The main unit 110 includes a time wheel TW. The main unit 110 simulates an RTOS environment of software to be embedded in a product, and causes the software to operate in an event-driven method to verify the software.

The task group switch control part 120 sets a priority to a task group (hereinafter, simply called "group"), and conducts a switch control of a task group to execute. The task group switch control part 120 includes a time update part 30, a task addition part 31, a group switching part 32, a delay interruption part 33, a scheduler 34, and a task execution part 35.

When a simulation time (hereinafter, simply called time) is notified from the time wheel TW of the main unit 110, the time update part 30 writes time in a time management area 30a. In a state of time t2, when a notice of time t3 is received, the time t3 is stored in the time management area 30a.

The task addition part 31 triggers an event to register an executable task, such as an interruption, a task activation, or the like. A new task is registered by being added to a respective group in a task area 32a.

The group switching part 32 is activated by an invent occurrence from the main unit 110 or the task addition part 31, and changes a priority for groups A, B, C, and D in the task area 32a by referring to a priority management table T21 for managing priority information of priorities of groups A, B, C, and D with respective reference times. Also, in a case in which a task added by the task addition part 31 is not executed due to a lower priority at a current time, the group switching part 32 instructs the delay interruption part 33 to set an interruption.

In the priority management table T21, for each of reference times t1, t2, t3, and t4, priorities of the groups A, B, C, and D are set. The priority management table T21 is stored in a storage area of the memory unit 12 or the storage unit 17. In this example, a value "H" (high) is set for a highest priority group, and a value "L" (low) is set for groups other than the highest priority group. Tasks of the group A are executed at higher priority at the reference time t1, tasks of the group B are executed at higher priority at the reference time t2, tasks of the group C are executed at higher priority at the reference time t3, and tasks of the group D are executed at higher priority at the reference time t4.

In the priority management table T21, at an interval of a predetermined simulation time, reference times are set so that tasks of groups A through D are uniformly assigned in sequence to the CPU 11. A count of reference times corresponds to a count of groups. Accordingly, a reference time is indicated by a remainder resulted from dividing total time managed by the priority management table T21 with current time.

The delay interruption part 33 includes a delay interruption table T23. The delay interruption part 33 calculates a nearest future time from the reference time at which the high priority is set to a group to which an added task belongs, and adds an event at a corresponding time in the time wheel TW of the main unit 110 so that the event is triggered at the calculated time. Then, the delay interruption part 33 sets the calculated time as an interruption time of the group of the added task in the delay interruption table T23.

The delay interruption table T23 is stored in the storage area and is a table using an associative array in which an interruption time is set for a key identifying a group. In a case in which an interruption time T1 is 120 msec to trigger an event due to an execution of the group A, the associative array may be formed as follows:

delay["group A"]=120 msec

The scheduler 34 is activated in response to a process end of the group switching part 32. The scheduler 34 schedules an execution order with respect to the tasks of the group having the highest priority in the task area 32a, and causes the task execution part 35 to execute the tasks of the group in accordance with the execution order.

The task execution part 35 executes the tasks indicated by the scheduler 34.

A flow of the entire process conducted by the task group switch control part 120 in the first embodiment will be described by indicating steps.

<Event Occurrence for Task Registration>

In step S1, the task addition part 31 occurs an event such as the interruption, the task activation, or the like, to register the executable task.

<Task Group Switch>

In step S2, the group switching part 32 is activated by the event triggered by the task addition part 31.

In step S3, the group switching part 32 acquires a current time by referring to the time management area 30a.

In step S4, the group switching part 32 acquires the priority for each of groups at the current time by referring to the priority information managed in the priority management table T21, and specifies the highest priority group. If the current time is the time t3, the priorities of the groups A, B, and D indicate "L" (low) and the priority of the group C indicates "H" (high). The group C is specified as the highest priority group.

In step S5, the group switching part 32 determines based on a value of the priority whether or not the group of the task to be added is assigned at the current time. If the priority indicates "H" (high) (if the task, which is added at the time t3 being the current time, belongs to the group C), steps S6 and S7 are omitted and step S8 is conducted.

On the other hand, if the priority indicates "L" (low) (if the task, which is added at the time t3 being the current time, belongs to one of the groups A, B, and D), it is determined that the task having the low priority is not assigned at the current time. Then, the group switching part 32 instructs the delay interruption part 33 to set a delay interruption, in order to execute the tasks at the nearest future time in times at which the groups of the task are assigned.

In step S6, in response to an instruction of setting the delay interruption from the group switching part 32, the delay interruption part 33 refers to the priority management table T21, and calculates the nearest future time in which the priority of the group of the added task will become high, from the current time. Therefore, with respect to the time wheel TW of the main unit 110, an event is added to the nearest future time. Also, the delay interruption part 33 sets the nearest future time for the group of the added task for the group of the added task. If a task is added to the group A, time T1 being the nearest future time at which the priority of the group A will become high is set as the interruption time T1 in which the group A is a key in the delay interruption table T23.

In step S7, the group switching part 32 is activated by an occurrence of an event which is added to the time wheel TW of the main unit 110 at the interruption time. Similarly to adding the task, the group switching part 32 acquires the current time (step S3). Also, the group switching part 32 refers to the priority information managed in the priority management table T21, acquires each priority of the groups at the current time, specifies the highest priority group (step S4), and advances to step S8.

If the event is triggered at the time T1, the group switching part 32 refers to the priority information managed in the priority management table T21, and determines that the priority of the group is highest.

In step S8, the group switching part 32 changes the priorities of the groups in the task area 32a in accordance with contents acquired in step S4. In a case of the current time t3, the priority "H" (high) of the group B at previous time t2 is changed to the priority "L" (low), and the priority "L" (low) of the group C at previous time t2 is changed to the priority "H" (high).

<Scheduling>

In step S9, when the group switching part 32 ends the process of changing the priority, the group switching part 32 activates the scheduler 34.

In step S10, the scheduler 34 refers to the task area 32a, and acquires the priority which is changed by the group switching part 32.

In step S11, the scheduler 34 causes the task execution part 35 to execute tasks of the highest priority group.

In step S12, when the task execution part 35 executes the task indicated by the scheduler 34 and a process by the task ends, the task execution part 35 activates the scheduler 34. The steps S11 and S12 are repeated until the tasks of the highest priority group end.

As described above, the task group switch control part 120 may operate when the task is added or at time when the priority of the group of the added task becomes high. It is possible to eliminate processes to change the priority by occurring the interruption at a predetermined interval. Accordingly, unwanted processes can be eliminated during time in which the software of the verification target is not executed, and the simulation can be conducted at higher speed.

In the following, a process conducted by each of parts 31 through 35 will be described.

Figure 3:
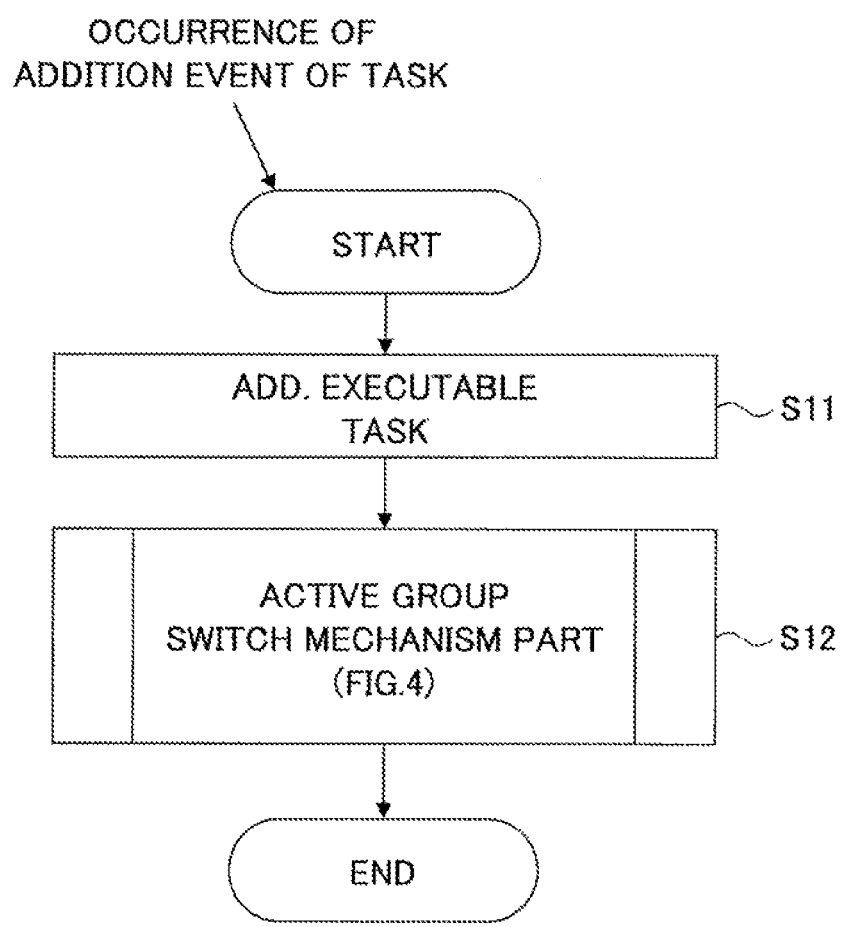
FIG. 3 is a diagram for explaining a process conducted by a task addition part in the functional configuration example illustrated in FIG. 2.

FIG. 3 is a diagram for explaining a process conducted by the task addition part 31 in the functional configuration example illustrated in FIG. 2. In FIG. 3, the task addition part 31 adds the executable task to the respective group in the task area 32a (step S11). Then, the task addition part 31 activates the group switching part 32 (step S12).

Figure 4:
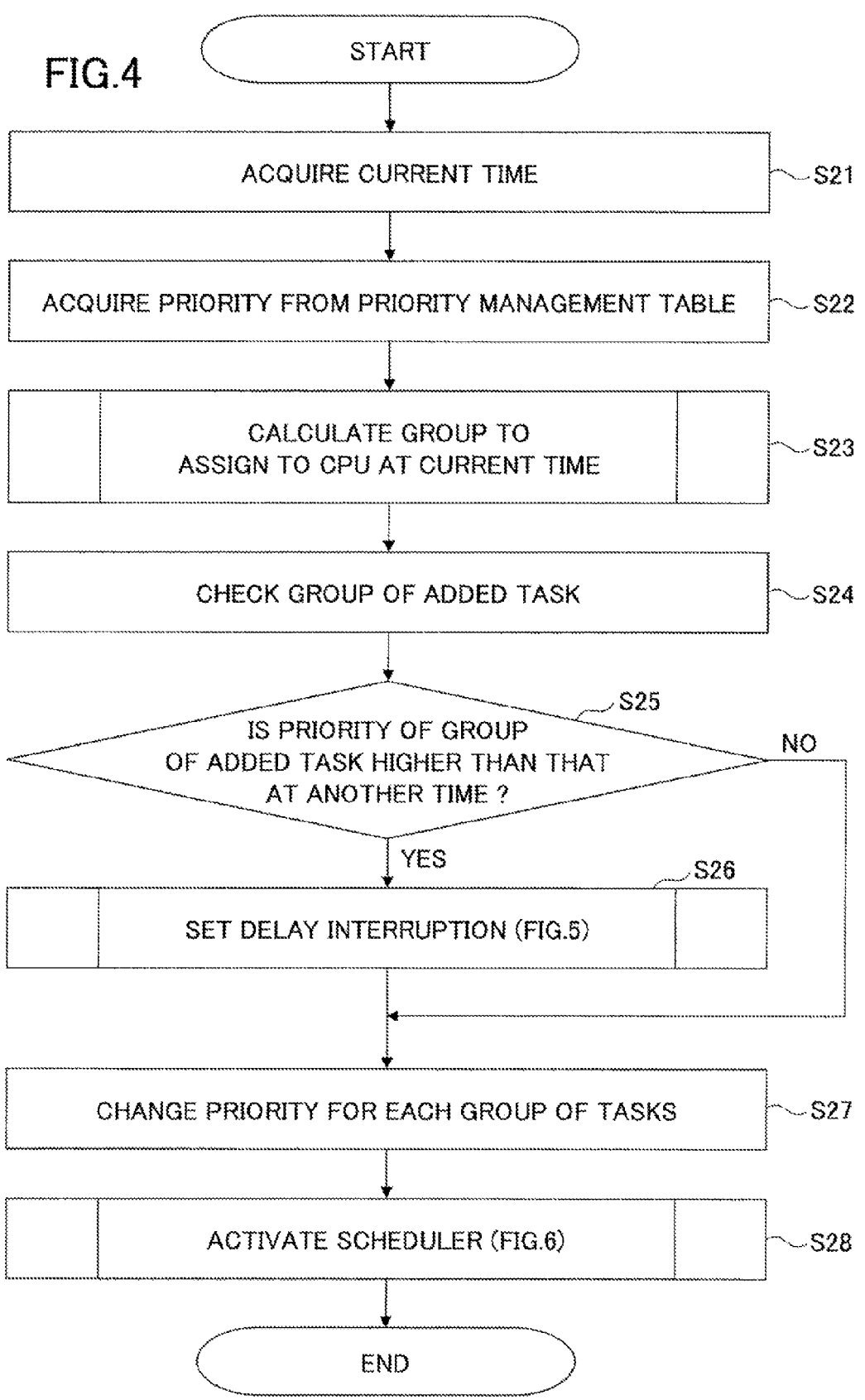
FIG. 4 is a diagram for explaining a process conducted by a group switching part in the functional configuration example illustrated in FIG. 2.

FIG. 4 is a diagram for explaining a process conducted by the group switching part 32 in the functional configuration example illustrated in FIG. 2. In FIG. 4, the group switching part 32 refers to the time management area 30a, and acquires the current time (step S21).

After that, the group switching part 32 acquires each priority of the groups for each reference time by using the priority information managed by the priority management table T21 (step S22), and calculates a group to assign to the CPU 11 at the current time (step S23).

In a process of the step S23, the group switching part 32 acquires the reference time based on a remainder resulted from dividing total time managed by the priority management table T21 with current time, and specifies a group having a priority "H" (high) at the acquired reference time in the priority management table T21.

The group switching part 32 checks whether the group of the added task is the group of the priority "H" (high) specified in step S23 (step S24), and determines whether the priority of the group of the added task is high at another time (step S25). When the group of the added task is the group of the priority "H" (high), the group switching part 32 determines that the priority is high at the current time, and advances to step S27.

On the other hand, in a case in which the group of the added task is not the group of the priority "H" (high), when the group switching part 32 determines that the priority is high at another time, the group switching part 32 causes the delay interruption part 33 to set the delay interruption so that the added task is activated at the nearest future time at which the group to which the added task belongs is assigned to the CPU 11 (step S26).

A reference time at which first, the priority becomes high, is acquired by using each priority of the groups for each reference time acquired in step S22, and the nearest future time is calculated by the acquired reference time and the current time.

Then, after the group switching part 32 changes each priority of the groups to a value of each priority at the current time based on the priority acquired from the priority information managed in the priority management table T21 in the step S22 (step S27), and activates the scheduler 34 (step S28).

Figure 5:
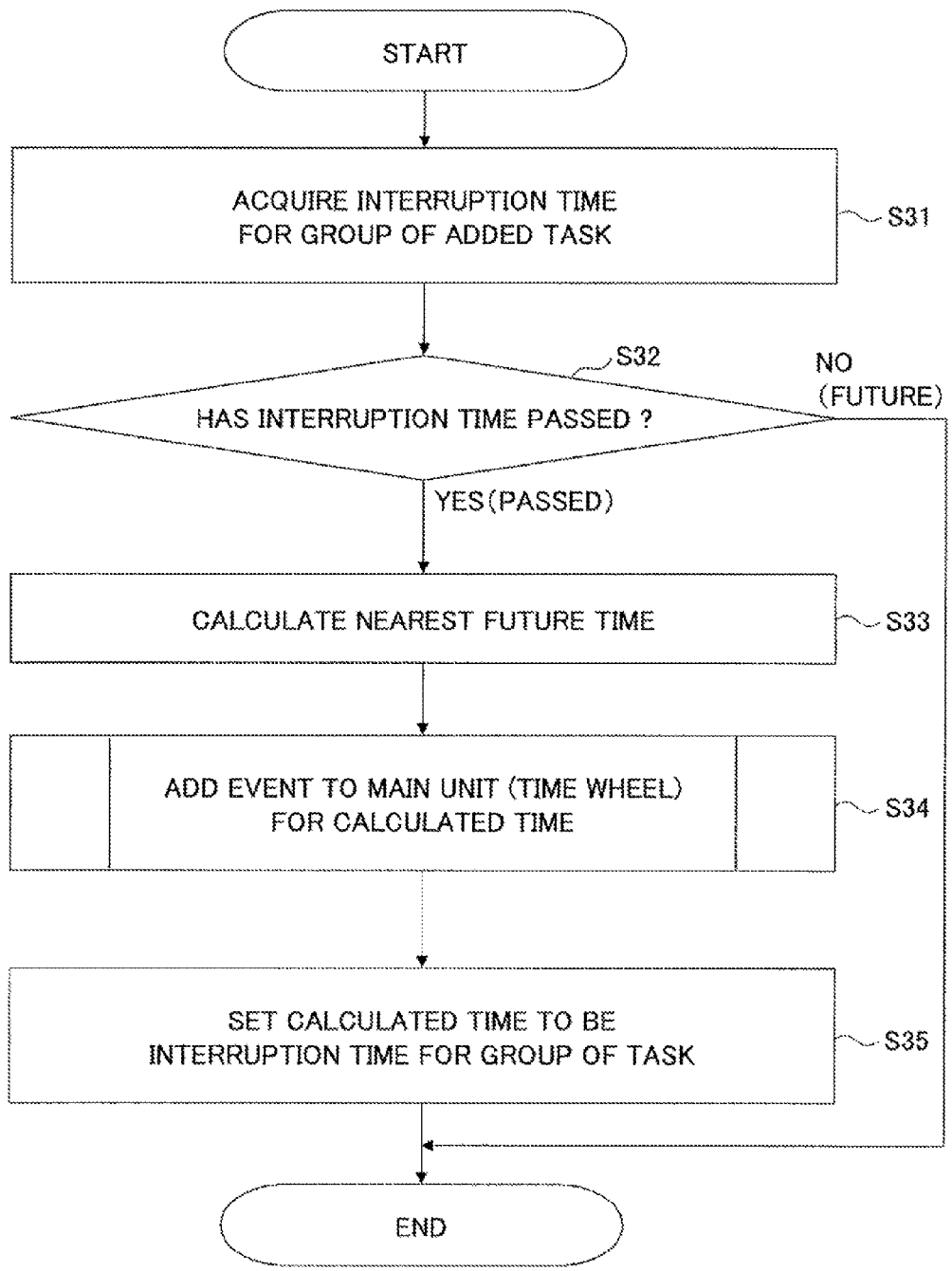
FIG. 5 is a diagram for explaining a process conducted by a delay interruption part in the functional configuration example illustrated in FIG. 2.

FIG. 5 is a diagram for explaining a process conducted by the delay interruption part 33 in the functional configuration example illustrated in FIG. 2. In FIG. 5, the delay interruption part 33 acquires the interruption time of the group to which the added task belongs, from the delay interruption table T23 (step S31).

After that, the delay interruption part 33 compares the interruption time acquired in the step S31 with the current time, and determines whether the interruption time has passed (step S32). When the interruption time is a future time, the delay interruption part 33 terminates this process.

On the other hand, if the interruption time has passed, the delay interruption part 33 calculates the nearest future time at which the CPU 11 is assigned to the group of the added task, based on the reference time of the group managed the priority management table T21 (step S33).

The delay interruption part 33 adds the event to the time wheel TW of the main unit 110 so that the group switching part 32 is activated at the nearest future time calculated in the step S33 (step S34).

Also, the delay interruption part 33 sets the nearest future time calculated in the step S33 to be the interruption time of the group of the added task in the delay interruption table T23 (step S35). In a case in which the delay interruption table T23 is the associative array and an interruption time T2 is 150 msec to trigger the event due to an execution of the group B, the interruption time may be set as follows:

delay["group B"]=150 msec

Figure 6:
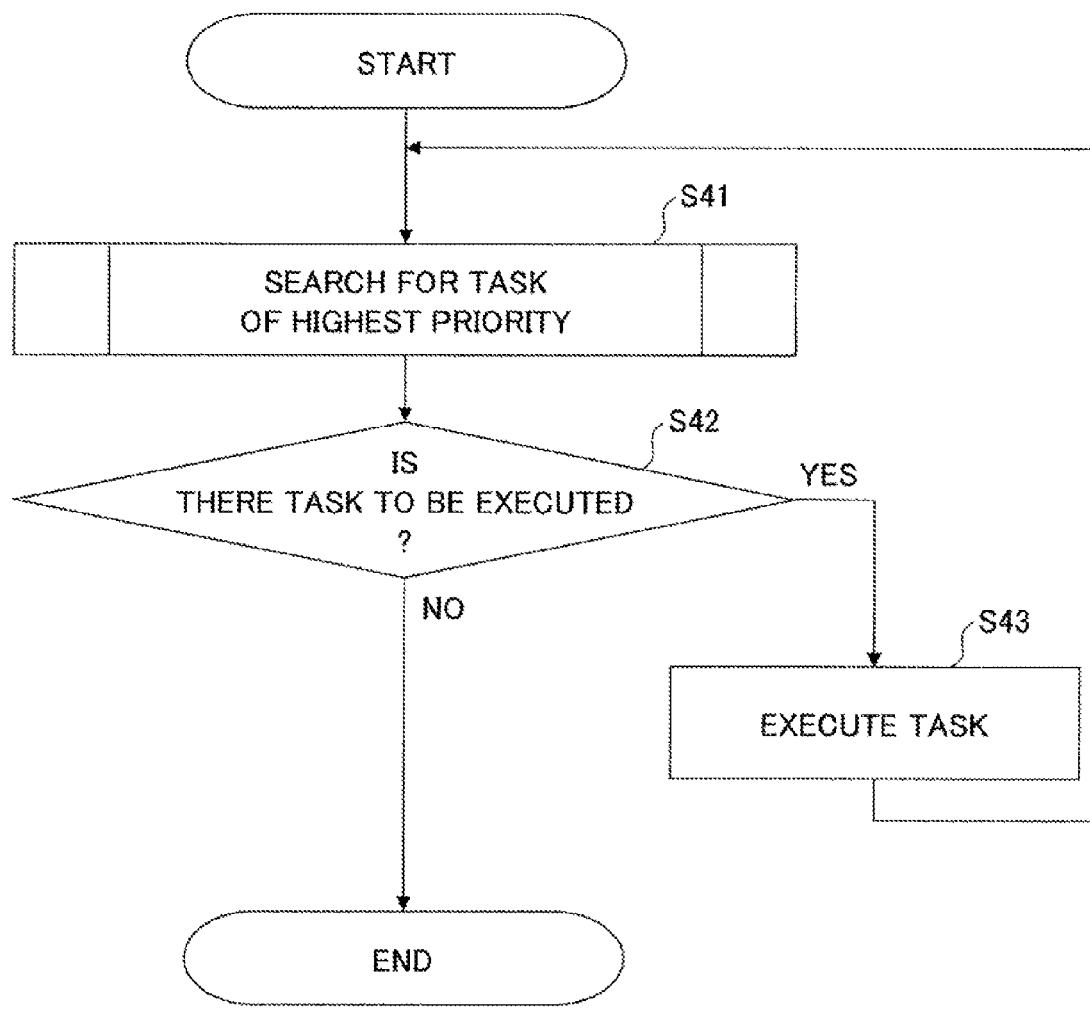
FIG. 6 is a diagram for explaining a process conducted by a scheduler in the functional configuration example illustrated in FIG. 2.

FIG. 6 is a diagram for explaining a process conducted by the scheduler 34 in the functional configuration example illustrated in FIG. 2. In FIG. 6, the scheduler 34 searches for a task belonging to the highest priority group in tasks to be scheduled (step S41).

The scheduler 34 determines whether there is an executable task (step S42). If there is no executable task, the scheduler 34 terminates this process. On the other hand, if there is the executable task, the scheduler 34 causes the task execution part 35 to execute the executable task (step S43). When the execution of the task by the task execution part 35 ends, the scheduler 34 goes back to the step S41, and repeats the above-described processes until the executable task does not exist.

Figure 7:
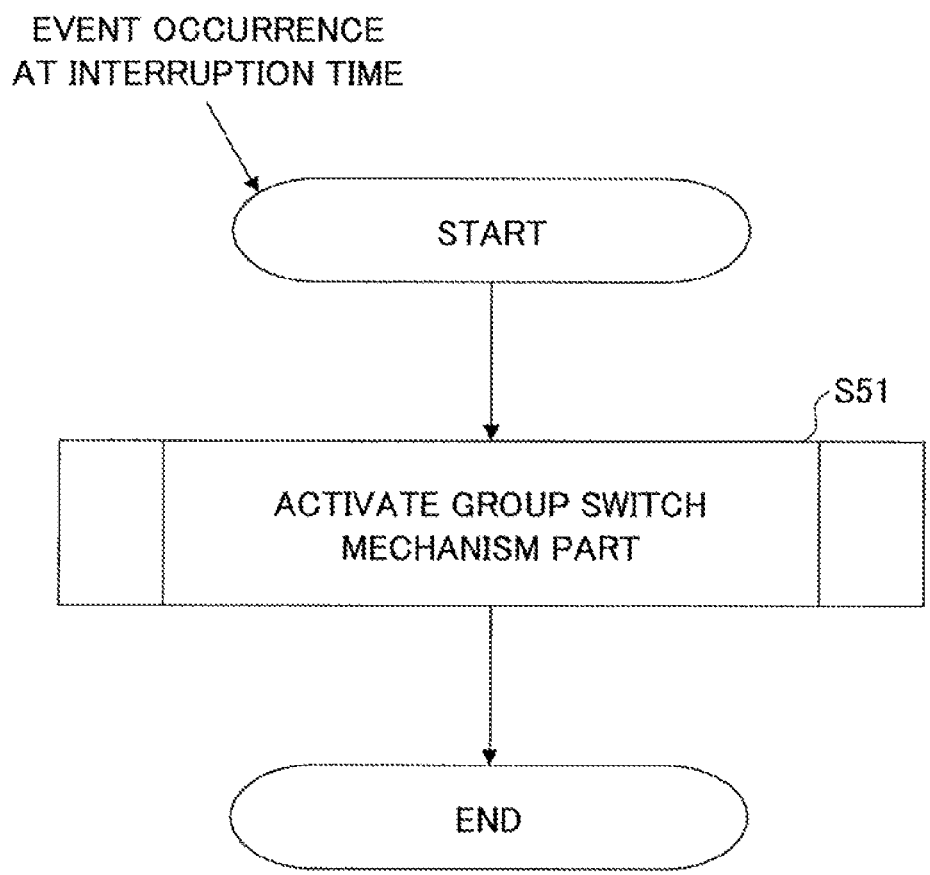
FIG. 7 is a diagram for explaining a process conducted by an event occurrence from a main unit in the functional configuration example illustrated in FIG. 2.

FIG. 7 is a diagram for explaining a process conducted by an event occurrence from the main unit 110 in the functional configuration example illustrated in FIG. 2. In FIG. 7, in the time wheel TW of the main unit 110, at the interruption time at which the event is added by the delay interruption part 33, the group switching part 32 is activated by the event occurrence from the main unit at the interruption time, and the process described with reference to FIG. 4 is conducted by the group switching part 32 (step S51).

<Second Embodiment>

In the first embodiment, a mechanism is described in which in order to execute a task added from the main unit 110, the event is triggered at time at which the priority of the group to which the added task becomes high. In a second embodiment, a configuration, in which the mechanism is included within a task group switch control part, will be described below.

Figure 8:
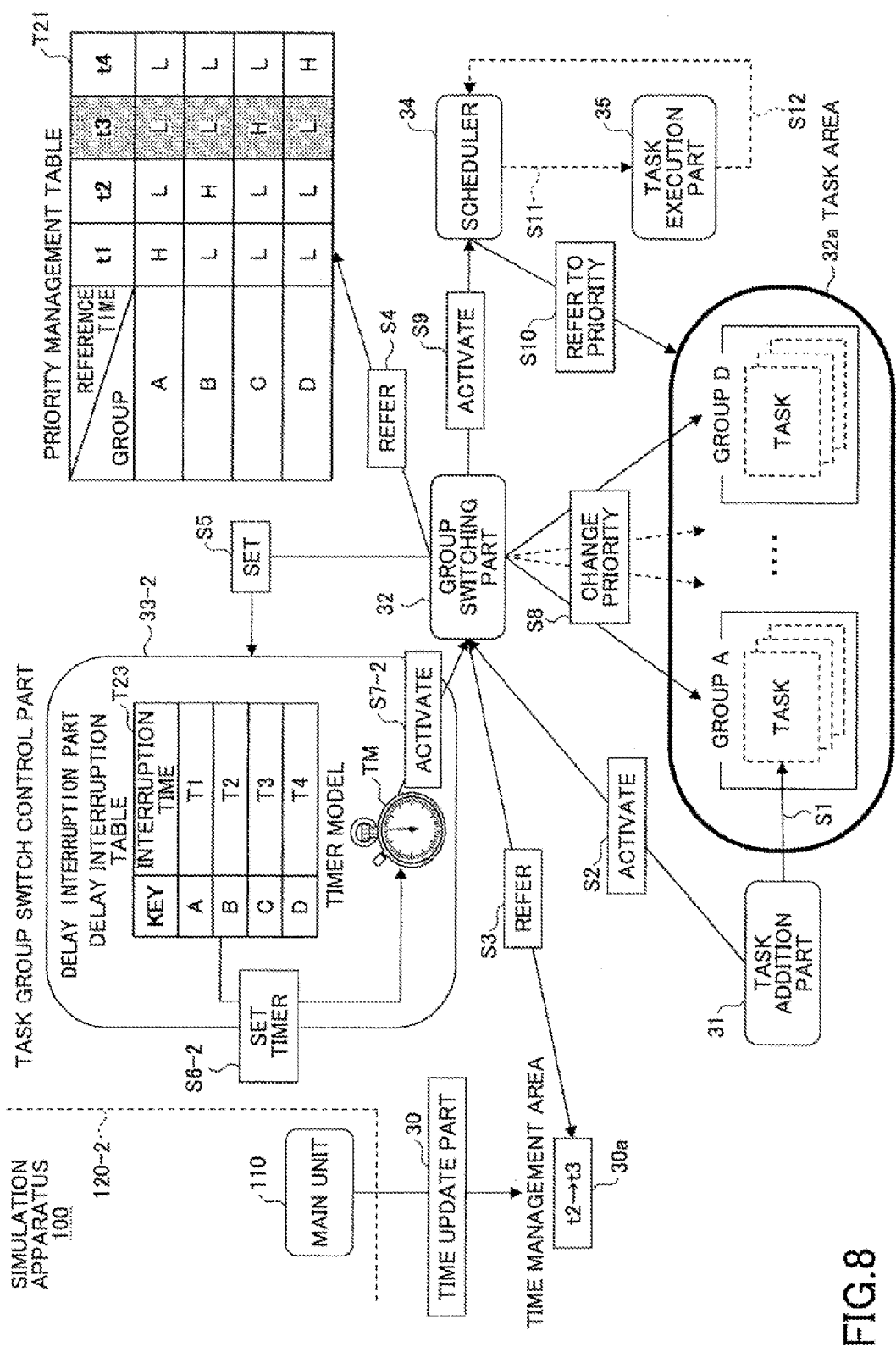
FIG. 8 is a diagram illustrating a functional configuration example of a simulation apparatus in a second embodiment.

FIG. 8 is a diagram illustrating a functional configuration example of the simulation apparatus 100 in the second embodiment. In FIG. 8, parts that are the same as those parts in FIG. 2 are designated by the same reference numerals, and the explanation thereof is omitted. In FIG. 8, the simulation apparatus 100 mainly includes the main unit 110 and a task group switch control part 120-2. The main unit 110 and the task group switch control part 120-2 can be realized by the CPU 11 which executes respective programs.

The task group switch control part 120-2 includes the time update part 30, the task addition part 31, the group switching part 32, and a delay interruption part 33-2, the scheduler 34, and the task execution part 35, similar to the first embodiment. Different from the first embodiment, the delay interruption part 33-2 includes a timer model TM, and can activate the group switching part 32 from the delay interruption part 33-2 itself, by using the timer model TM.

In the entire flow of a process conducted by the task group switch control part 120-2 in the second embodiment, process portions different from the first embodiment are steps S6-2 and S7-2 related to the process conducted by the delay interruption part 33-2 in response to an instruction of setting a delay interruption from the group switching part 32 in step S5. The steps S6-2 and S7-2 will be described below.

In step S6-2, in response to the instruction of setting the delay interruption from the group switching part 32, the delay interruption part 33-2 refers to the reference time of the group managed in the priority management table T21 and calculates the nearest future time at which the priority group of the added task will become high, from the current time. The delay interruption part 33-2 sets the nearest future time for the group of the added task in the delay interruption table T23, and sets the nearest future time to an activation time of the timer model TM.

In step S7-2, the timer model TM of the delay interruption part 33-2 refers to the delay interruption table T23 at a predetermined interval. If there is a group for which the interruption time is set, the group switching part 32 is activated.

The delay interruption part 33-2, which operates different from the first embodiment, will be described. FIG. 9 is a diagram for explaining a process conducted by the delay interruption part 33-2 in the functional configuration example illustrated in FIG. 8. In FIG. 9, the delay interruption part 33-2 acquires the interruption time of the group to which the added task belongs, from the delay interruption table T23 (step S81).

After that, the delay interruption part 33-2 compares the interruption time acquired in the step S81 with the current time, and determines whether the interruption time has passed (step S82). In a case in which the interruption time is a future time, the delay interruption part 33-2 terminates this process.

On the other hand, if the interruption time is the past time, the delay interruption part 33-2 calculates the nearest future time possible to assign the CPU 11 for the group of the added task (step S83).

After that, the delay interruption part 33-2 sets the nearest future time calculated in the step S83 to the interruption time of the group of the added task in the delay interruption table T23 (step S84). In a case in which the delay interruption table T23 is the associative array and an interruption time T2 is 150 msec to trigger the event due to an execution of the group B, the interruption time may be set as follows:

delay["group B"]=150 msec

Also, the delay interruption part 33-2 calculates the activation time to set to the timer model TM (step S85), and sets the calculated activation time to the timer model TM (step S86), so that the group switching part 32 is activated at the nearest future time calculated in the step S83.

Advantages concerning the first embodiment and the second embodiment described above will be described with reference to FIG. 10A and FIG. 10B. In FIG. 10A and FIG. 10B, a horizontal axis indicates the simulation time.

FIG. 10A illustrates an interruption occurrence state in a case in which the first and second embodiment are not applied. In FIG. 10A, a change of the priority for the group to which the task belongs is conducted by causing a timer interruption at a predetermined interval (of 1 ms or the like). After the priority of the group A is changed by a timer interruption of 100 ms, when an interruption 70*a* occurs from a peripheral model to the group A in a term in which the task of the group A is executed with the highest priority, the task belonging to group A in tasks is activated by an ISR (Interrupt Service Routine) execution 71*a* and a task process is executed.

On the other hand, in a case in which an interruption 70*b* occurs from the peripheral model to the group B, since the group A is a group for the task to be executed with the highest priority, the task is executed by an ISR execution 71*b* when the priority is changed to the group B by the timer interruption.

In the interruption occurrence state illustrated in FIG. 10A in which the first and second embodiments are not applied, even in a term 10*a* between tasks in which the software of the verification target does not actually operate, a process for the timer interruption to change the timer interruption is conducted at a predetermined interval and a switch process is conducted to switch to a high priority group.

FIG. 10B illustrates an interruption occurrence state in which the first or second embodiment is applied. In the interruption occurrence state in FIG. 10B, the process for the timer interruption at the predetermined interval to change the timer interruption is not conducted.

When the interruption 70*a* occurs from the peripheral model to the group A, a process part corresponding to the group switching part 32 calculates a group to assign to the CPU 11 in accordance with the flowchart illustrated in FIG. 4. In a case of the interruption 70*a*, since it is time to assign the group A to the CPU 11, the task is activated by the ISR execution 72*a* and the task process is executed.

On the other hand, referring to FIG. 10B, when the interruption 70*b* occurs from the peripheral model to the group B, since the group A is a group of the task to be executed with priority, a delay interruption process is conducted by the ISR execution 72*b* at the nearest future time which is time to assign to the group B.

According to the first or second embodiment, since the group is switched when the event is triggered to start an operation of the software being the verification target, an unwanted process is not conducted in the term 10*a* between the tasks in which the software of the verification target is not executed. Thus, it is possible to execute the simulation at higher speed.

The event to activate the task may be an IRQ (Interrupt Request), an ActiveTask, a SetEvent, a WaitEvent, an IRQ end, a TASK end, or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A simulation apparatus, comprising a computer being configured to perform a process including:
 referring to a priority management table, which manages priority information of priorities to assign a CPU for multiple groups of tasks stored in a storage area, the priority information defined for each of reference times so that the tasks of the multiple groups are assigned in sequence to the CPU; and
 when a first interruption to a task of a first group of the multiple groups occurs at a first time in a first term in which a high priority is set to the first group, causing an event corresponding to the first interruption to occur in the first term, and when a second interruption to a task of a second group of the multiple groups occurs at the first time, causing an event corresponding to the second interruption to occur at an interruption time by a delay interruption after the first time, the interruption time being a nearest future time at which a high priority is set to the second group, the nearest future time being calculated based on a current time and a reference time at which a high priority is set to the second group in the priority management table.

2. The simulation apparatus as claimed in claim 1, wherein the process further includes:
 selecting one of the reference times by calculating from the current time of the simulation;
 determining one of the multiple groups of tasks which has a high priority at the current time based on the priority information defined for a selected reference time; and
 changing the priorities of the multiple groups of tasks based on the priority information of the selected reference time corresponding to the current time.

3. The simulation apparatus as claimed in claim 1, wherein the process further includes referring to one or more reference times when the priority of the first group to which the task to be executed belongs indicates high, by using the priority information managed in the priority management table, to calculate from the current time of the simulation, and to determine the nearest future time at which the priority of the first group will become high.

4. The simulation apparatus as claimed in claim 1, wherein the process further includes adding the event to the interruption time of a time wheel in a main unit, the interruption time to conduct the delay interruption.

5. The simulation apparatus as claimed in claim 1, wherein the causing the event sets the interruption time to conduct the delay interruption to a timer model, so as to delay the event occurring.

6. The simulation apparatus as claimed in claim 1, wherein a count of the reference times corresponds to a count of the multiple groups.

7. A simulation method performed in a computer, comprising:
 referring to, by the computer, a priority management table, which manages priority information of priorities to assign a CPU for multiple groups of tasks stored in a storage area, the priority information defined for each of reference times so that the tasks of the multiple groups are assigned in sequence to the CPU; and
 when a first interruption to a task of a first group of the multiple groups occurs at a first time in a first term in which a high priority is set to the first group, causing, by the computer, an event corresponding to the first interruption to occur in the first term, and when a second interruption to a task of a second group of the multiple groups occurs at the first time, causing, by the computer, an event corresponding to the second interruption to occur at an interruption time by a delay interruption after the first time, the interruption time being a nearest future time at which a high priority is set to the second group, the nearest future time being calculated based on a current time and a reference time at which a high priority is set to the second group in the priority management table.

8. A non-transitory computer-readable recording medium recorded with a program which, when executed by a computer, causes the computer to perform a process comprising:
referring to a priority management table, which manages priority information of priorities to assign a CPU for multiple groups of tasks stored in a storage area, the priority information defined for each of reference times so that the tasks of the multiple groups are assigned in sequence to the CPU; and
when a first interruption to a task of a first group of the multiple groups occurs at a first time in a first term in which a high priority is set to the first group, causing an event corresponding to the first interruption to occur in the first term, and when a second interruption to a task of a second group of the multiple groups occurs at the first time, causing an event corresponding to the second interruption to occur at an interruption time by a delay interruption after the first time, the interruption time being the nearest future time at which a high priority is set to the second group, the nearest future time being calculated based on a current time and a reference time at which a high priority is set to the second group in the priority management table.

* * * * *